United States Patent [19]

Triplette

[11] Patent Number: 5,421,653
[45] Date of Patent: Jun. 6, 1995

[54] SLIDE SYSTEM
[75] Inventor: R. Eugene Triplette, Pilot Mountain, N.C.
[73] Assignee: Southern Tool Manufacturing Co., Winston-Salem, N.C.
[21] Appl. No.: 51,559
[22] Filed: Apr. 23, 1993
[51] Int. Cl.⁶ .................. F16C 33/02; A47B 88/04
[52] U.S. Cl. .................. 384/42; 312/334.32; 384/20
[58] Field of Search .............. 384/7, 17, 20, 22, 23, 384/26, 29, 34, 35, 37, 41, 42; 312/330.1, 334.1, 334.6, 334.7, 334.8, 334.22, 334.23, 334.24, 334.27, 334.28, 334.29, 334.31, 334.32, 334.14

[56] References Cited

U.S. PATENT DOCUMENTS

| | | | |
|---|---|---|---|
| 825,695 | 7/1906 | Beaudet | 312/334.32 |
| 2,701,174 | 2/1955 | Franks | 312/330.1 X |
| 2,757,051 | 7/1956 | Wilmer et al. | 384/23 |
| 2,844,430 | 7/1958 | Bogar, Jr. | 384/17 |
| 3,456,996 | 7/1969 | Heiniger-Schar | 312/334.22 |
| 3,927,918 | 12/1975 | Dobbratz | 384/17 |
| 4,712,927 | 12/1987 | Arrendiell et al. | 384/23 |

FOREIGN PATENT DOCUMENTS

| | | | |
|---|---|---|---|
| 1240250 | 5/1967 | Germany | 312/334.32 |
| 3436393 | 4/1986 | Germany | 312/324.32 |
| 1158737 | 7/1969 | United Kingdom | 384/41 |

*Primary Examiner*—Thomas R. Hannon

[57] ABSTRACT

A slide system for movably connecting adjacent articles having support channels and cooperating flanges affixed to first and second articles movable in a parallel relationship with respect to each other. An internal sleeve is located within the support channel to cooperatively receive an engaging portion of the flange whereby the flange-engaging portion slidably moves within the internal sleeve to support and maintain the adjacent articles in substantially the same relationship with each other as they are moved with respect to each other. The channels and flanges may be functionally positioned in a variety of configurations with respect to the articles, and specific configurations can be utilized to successfully manage the loads and stresses associated with specific needs.

8 Claims, 13 Drawing Sheets

SLIDE SYSTEM

BACKGROUND OF THE INVENTION

1. Field of the Invention

The present invention relates to slide systems and more particularly, to a slide system that movably connects to adjacent articles.

2. Description of the Prior Art

Slides are used in a multitude of ways to support adjacent movable surfaces that move predictably parallel to each other in predetermined patterns. The most common example is the positioning of drawers or shelves within a housing so that they can be movably withdrawn and replaced. A drawer can be mounted into the opening of an accommodating cabinet or desk by simply being built to size and slipped into the opening. Inexpensive furniture and cabinet construction is often accomplished in this manner. However, a drawer mounted in such a way often sticks, turns slightly sideways when pulled or pushed (and therefore binds), fits unevenly when shut, and extends inwardly of the front of the cabinet or frame. Occasionally, it falls from the supporting structure when inadvertently pulled too far even when not totally withdrawn, and often tilts downwardly forward in an awkward fashion.

It is obviously desirable to provide a mounting that will overcome the shortcomings mentioned above. In a first attempt, cooperating runners were mounted inside the wall of the apparatus and the slide of the drawer to stabilize the movement of the drawer. However, such runners do not allow the drawer to be pulled as far forward as desired. Moreover, the early runners did not enhance the sliding of the drawer except by reducing the surface area of the runners in comparison to with the entire drawer bottom resting on a mating bottom support of the cabinet or frame.

Eventually, slide mountings were introduced that included ball bearings and multiple nested pieces so as to permit the supported drawer to be pulled fully forward from its accommodating opening while remaining supported or held in position to be returned. Such supports have universally been comprised of metallic pieces which are stronger and less fragile than wooden runners. It is apparent that metallic runners are acceptable in many, if not most, applications because of their strength. They do, however, need lubrication and are expensive to fabricate compared with plastic. Plastic, on the other hand, although self-lubricating, has not been strong enough for most applications.

Some applications, for example, like that shown in U.S. Pat. No. 3,927,918, include plastic blocks encased by metal parts, which plastic blocks provide self-lubrication to the slide. However, the blocks themselves are surrounded by weight-bearing metal, and the weight is not evenly distributed along the slide, thus causing uneven wear. There has been an attempt to provide virtually all plastic extension slides for mounting drawers and the like without incorporating metal support. See, for example, the disclosure of U.S. Pat. No. 4,712,927. This has not proven to be entirely satisfactory because of the necessity of providing three separate parts to be carefully fitted. Moreover, the wear associated with the inner load-bearing part requires maintenance and part replacement from time to time which is expensive and time-consuming.

Thus, there is still a recognized need for an economical slide system that distributes force over the entire length of the slide and allows for multi-directional loading since many of the present slide systems can operate only in a horizontal environment. There is also a need to prevent slide system failure occurring occasionally when the slide malfunctions and slips from the track because of part failure, stress, or load.

The present invention has been developed to overcome these deficiencies.

OBJECTIVES AND SUMMARY OF THE INVENTION

Accordingly, an object of the present invention is to provide a new and improved slide system which has all the advantages of prior art devices and none of the disadvantages.

A further objective of the present invention is to provide a slide system of the type described that distributes force over a significant area of the slide.

Yet another objective of the present invention is to provide a slide system that allows for multi-directional loading because the system operates equally well with principle forces directed upwardly, downwardly, sidewards or at any angle at which the movably connected are slidably accessible.

Yet still another further objective of the present invention is to provide a slide system of the type described which includes a round interlocking configuration to prevent skipping or out-of-track movement and ensure consistent track throughout the motion of the slide.

Another objective of the present invention is to provide a slide system of the type described which can provide plastic to plastic slide contact while sufficient slide strength is ensured by supporting metallic members.

These objectives and others which will become apparent as the description proceeds are obtained by providing a slide system for movably connecting adjacent articles such as drawers or shelves in a movable parallel relationship with each other, the system having a support channel with an internal sleeve secured to one of the movable articles and a flange associated with the other movable article having an engaging portion extending into the internal sleeve of the support channel so that the flange and engaging portion slidably move within the internal sleeve to support and maintain the adjacent articles in substantially the same relationship with each other as they are moved in a substantially parallel relationship with respect to each other. The internal sleeve has a substantially circular interior and the flange-engaging portion has a substantially circular exterior to closely nest within the internal sleeve, thus resulting in smooth, efficient and load-distributing engagement.

Thus there has been outlined, rather broadly, the more important features of the invention in order that the detailed description that follows may be better understood and in order that the present contribution to the art may be better appreciated. There are obviously additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments and now being practiced and carried out in various ways.

It is also to be understood that the phraseology and terminology herein are for the purpose of description and should not be regarded as limiting in any respect. Those skilled in the art will appreciate the concept upon which this disclosure is based and that it may readily be utilized as a basis for designing other structures, methods and systems for carrying out the several purposes of this development. It is important that the claims be regarded as including such equivalent constructions insofar as they do not depart from the spirit and scope of the present invention.

BRIEF DESCRIPTION OF THE DRAWINGS

So that the manner in which the above-recited features, advantages and objects of the invention, as well as others which will become apparent, are attained and can be understood in detail, a more particular description of the invention briefly summarized above may be had by reference to the embodiment thereof which is illustrated in the appended drawings, which drawings form a part of this specification and wherein like characters of reference designate like parts throughout the several views. It is to be noted, however, that the appended drawings illustrate only a preferred and alternative embodiments of the invention and are therefore not to be considered limiting of its scope, as the invention may admit to additional equally effective embodiments.

Referring now to the drawings:

FIG. 6(a)–(j) is an illustration showing the various ways of mounting the support channel and its associated components in the slide system comprising the present invention;

DESCRIPTION OF PREFERRED EMBODIMENT

The slide system referenced herein can be used in a multitude of settings where two (2) surfaces move predictably with respect to each other. It is applicable, for example, to sliding drawers, shelves, door tracks for sliding doors on patios or showers and in numerous other arrangements and situations. For convenience of description herein, the example discussed will be primarily with respect to a drawer suitable for holding items within the confines of a front, back and two side walls, often being referred to as a suitable apparatus. Such apparatus includes file cabinets, desks, tables, consoles, and a multitude of furniture items and the like.

Figures 1, 2:
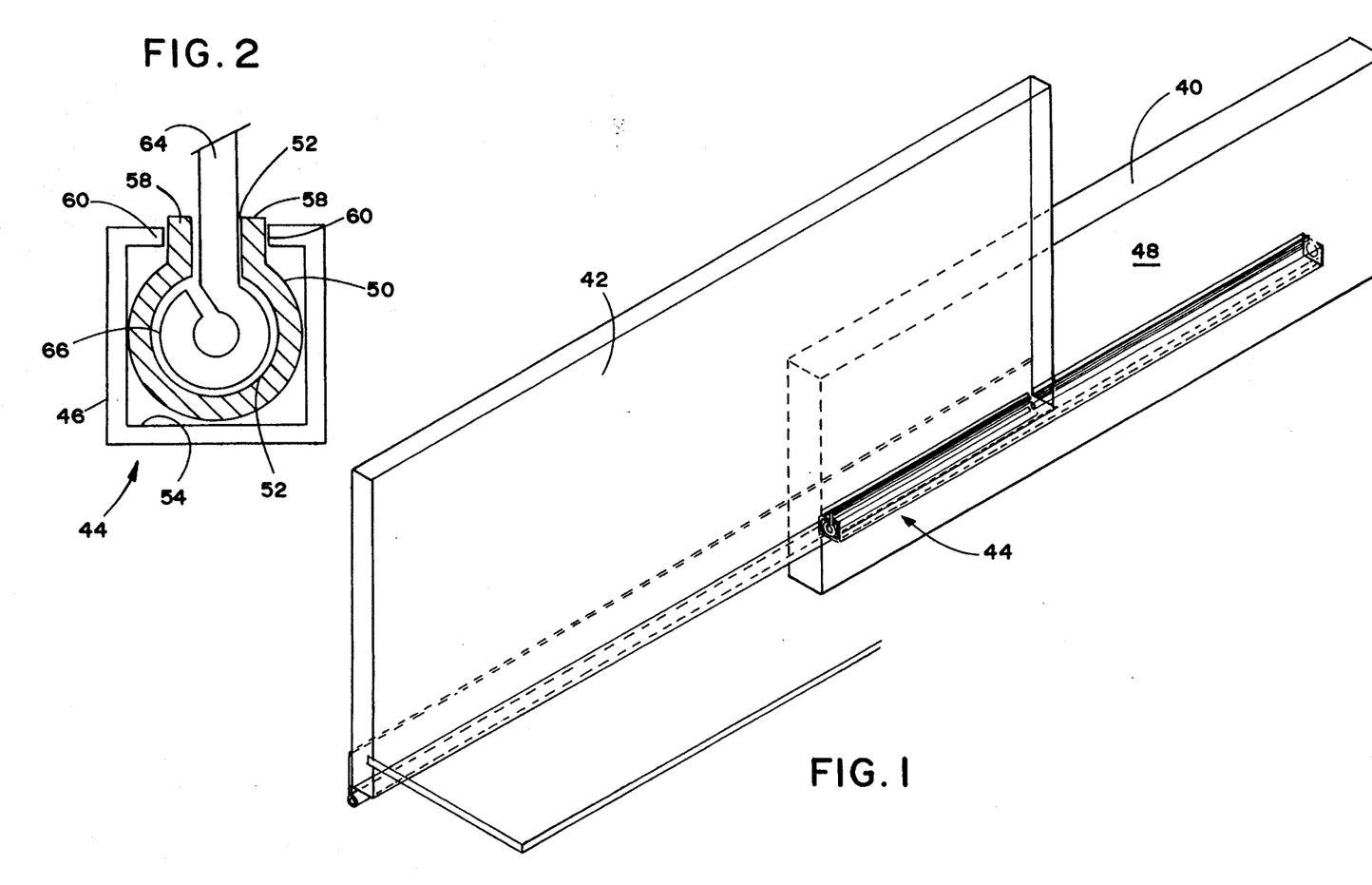
FIG. 1 is a perspective, fragmentary and sectional view of one embodiment of the slide system forming the present invention.
FIG. 2 is a front elevational, sectional and enlarged view of the slide system of FIG. 1 showing the support channel, the internal sleeve carried within the channel, and the flange and flange-engaging portion nesting within the sleeve.

Referring now to the drawings and particularly to FIG. 1, a housing 40 supports a slidably positioned drawer 42 for movement into and out of the housing structure. A guide system shown generally as 44 is conveniently positioned to maintain the drawer in a slidable relationship with the housing. The system is formed from a support channel 46 affixed in a conventional and convenient manner to one article surface 48 which has an internal sleeve 50 nested therein so that the sleeve interior configuration 52 is substantially circular and fills for the most part the interior 54 of support channel 46. The sleeve edges 58 are spaced apart and fitted to provide an opening 62.

A flange shown generally as 64 has a forward engaging portion 66 that can be formed from swaging the forward edge of the flange to a circular configuration as shown in FIG. 2 or by affixing a circular rod or other item shaped so that its exterior is substantially circular and therefore conforming to the interior 52 of sleeve 50. Thus a close slidable relationship is achieved between the exterior of flange projecting portion 66 and interior wall 52 of the internal sleeve 50.

Figures 3, 4:
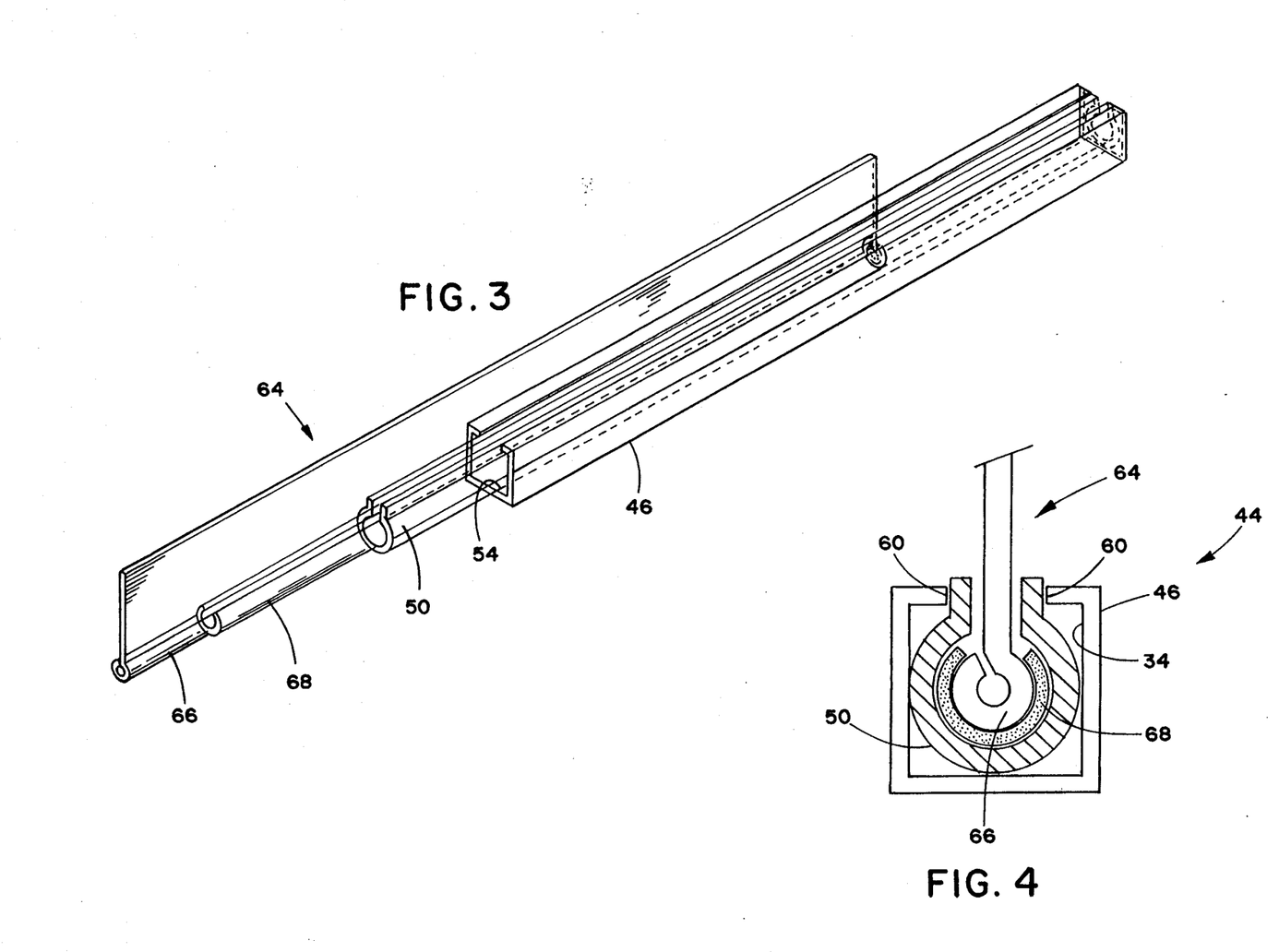
FIG. 3 is a perspective, sectional and fragmentary view of another embodiment of the slide system comprising the present invention.
FIG. 4 is an end elevational, sectional and fragmentary view of the embodiment of the present invention shown in FIG. 3.

Another variation of the slide system is shown in FIGS. 3 and 4 where again the slide system contains the support channel 46, internal sleeve 50, flange 64 and flange-engaging portion 66. In this instance, a flange-engaging portion cover 68 snaps or is otherwise physically attached to flange-engaging portion 66 to provide the exterior sliding surface that contacts interior wall 52 of internal sleeve 50.

Support channel 46 may be formed of metal or other suitable rigid material such as routed wood channels, extruded ridged plastic channels and the like. The internal sleeve is constructed of a suitable bearing material, generally polypropylene or other engineered plastic of high lubricity. Flange 64 is usually formed from metal because of the strength required, however other rigid materials are in many cases acceptable. Sleeve 50 can be formed of polypropylene or other plastic-bearing material and in one application, can be snap-fitted over flange-engaging edge 66. The materials used for internal sleeve 50 and flange-engaging cover 68 can be varied to meet the bearing and strength properties that are needed to enhance the mechanical properties of the slide for any given application. While the standard drawer slide will consist of polypropylene internal sleeves 50 supported by steel support channels 46 and flanges 44, the bearing properties of the standard slide may be modified for special applications such as, for example, those in the food industry where high heat-resistant equipment is necessary. In such cases, the selection of an engineered plastic, for example, an ultra-high molecular weight polypropylene sleeve 50 for placement inside channel 46 or the selection of a special stainless steel channel 46 may be required. Any number of combinations of material selections can be utilized to customize the slide system comprising the present invention to specialized applications.

Figure 5:
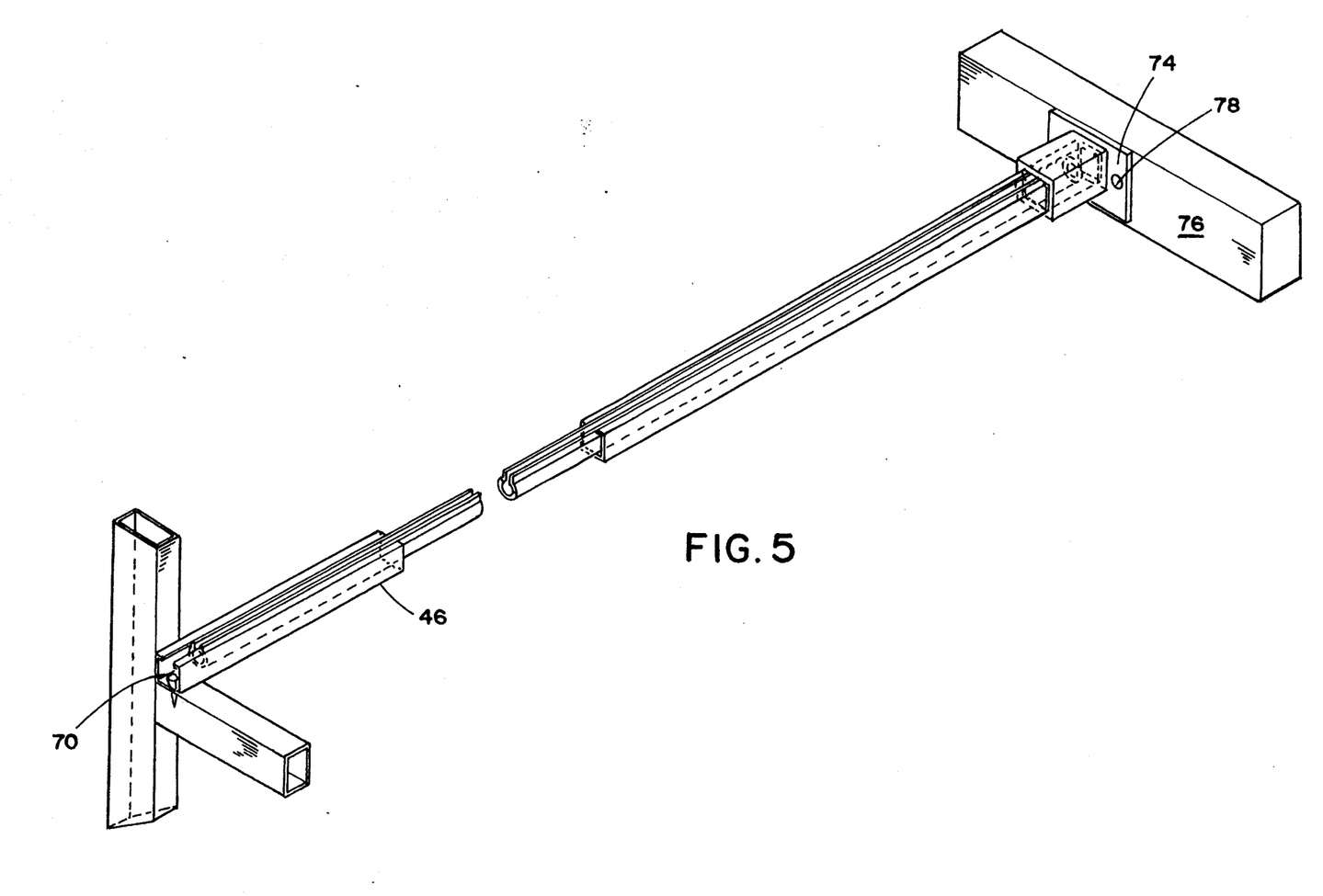
FIG. 5 is a perspective, fragmentary and sectional view of a mounted support channel showing the component's use for securing the channel to the front and back rails of a frame.

FIG. 5 illustrates a typical way of installing support channel 46 and its carried components to the frame of the supporting structure. A brad or screw 70 extends through an aperture provided in channel 46 and threadably engages front rail 72 in the manner shown. At the rear end of channel 46, a typical drawer slide fixture 74 may be utilized to telescopically support channel 46 and indirectly secure it to back rail 76 by brads or screws 78. In this illustration, the frame holds support channel 46 in a position to receive a downwardly extending flange (not shown) affixed to a supported drawer.

Figure 6:
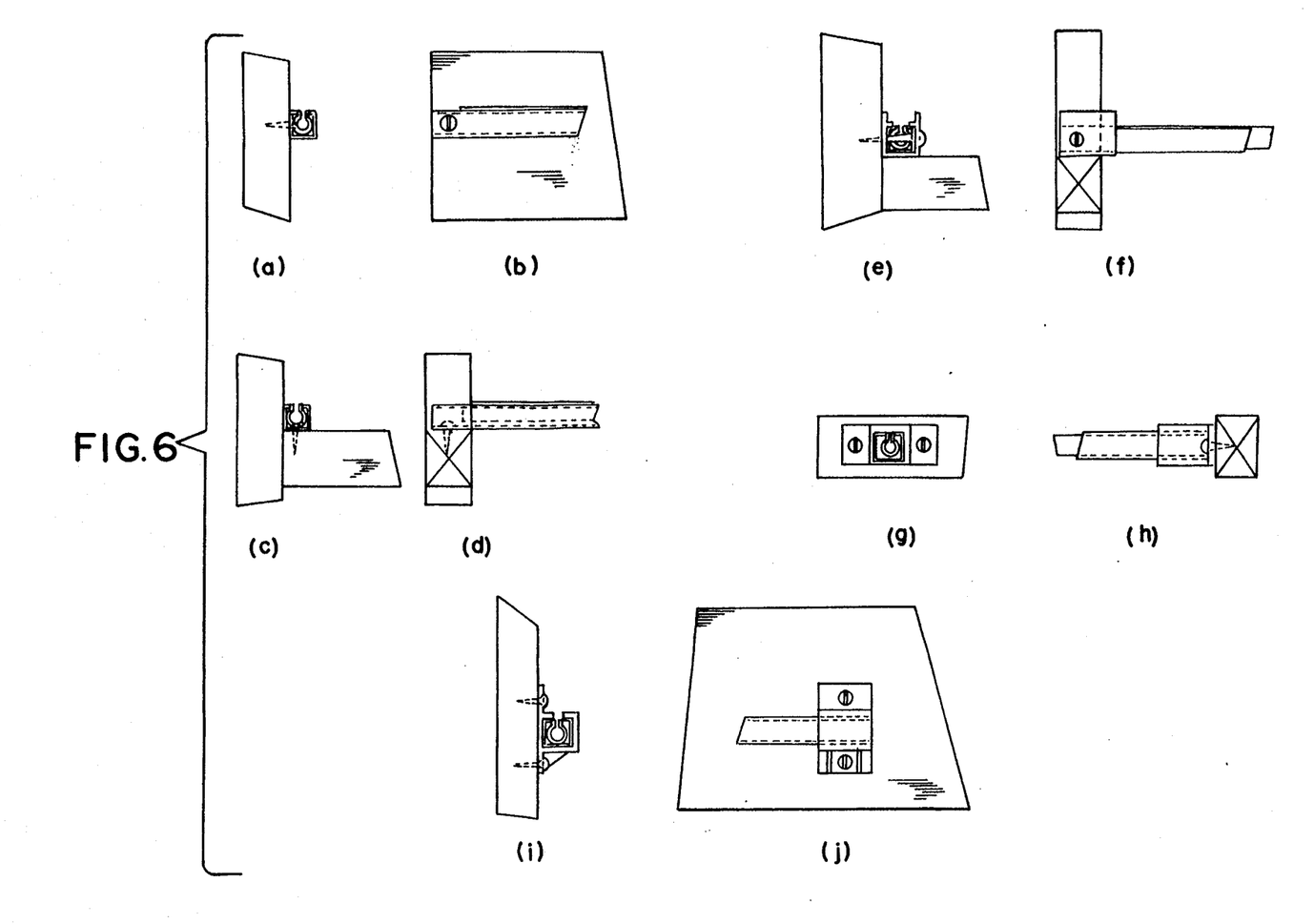
Figures 7, 8:
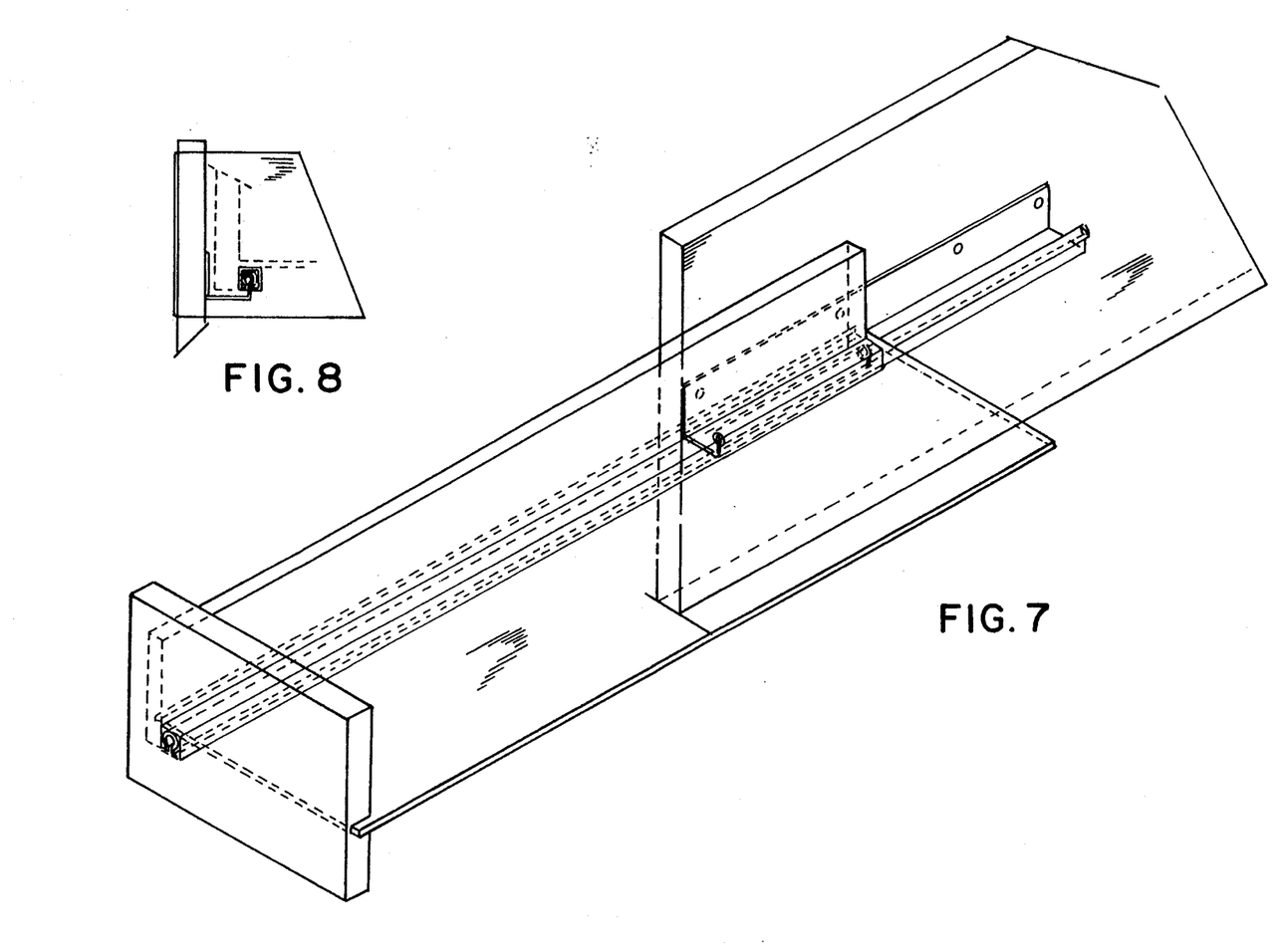
FIG. 7 is a perspective, fragmentary and sectional view of another application of the slide system forming the present invention wherein support channel is mounted to a movable drawer bottom and the flange is secured to an end panel.
FIG. 8 is an end elevational, sectional view of the arrangement shown in FIG. 7.
Figures 9, 10:
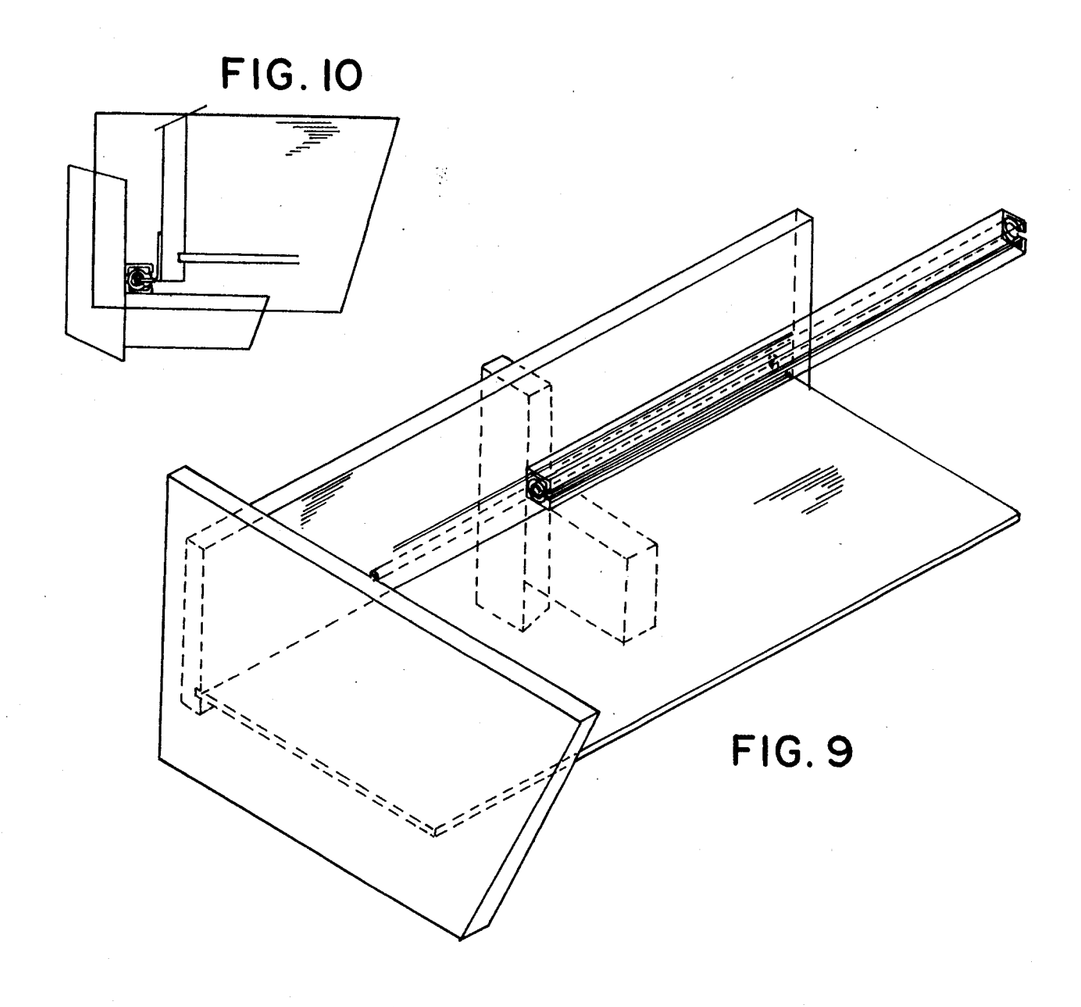
FIG. 9 is a perspective, fragmentary and sectional view of another arrangement of a slide system forming the present invention wherein the support channel is secured to the frame and the flange affixes to a suspended drawer side.
FIG. 10 is an end elevational, sectional view of the arrangement shown in FIG. 9.
Figures 11, 12, 13:
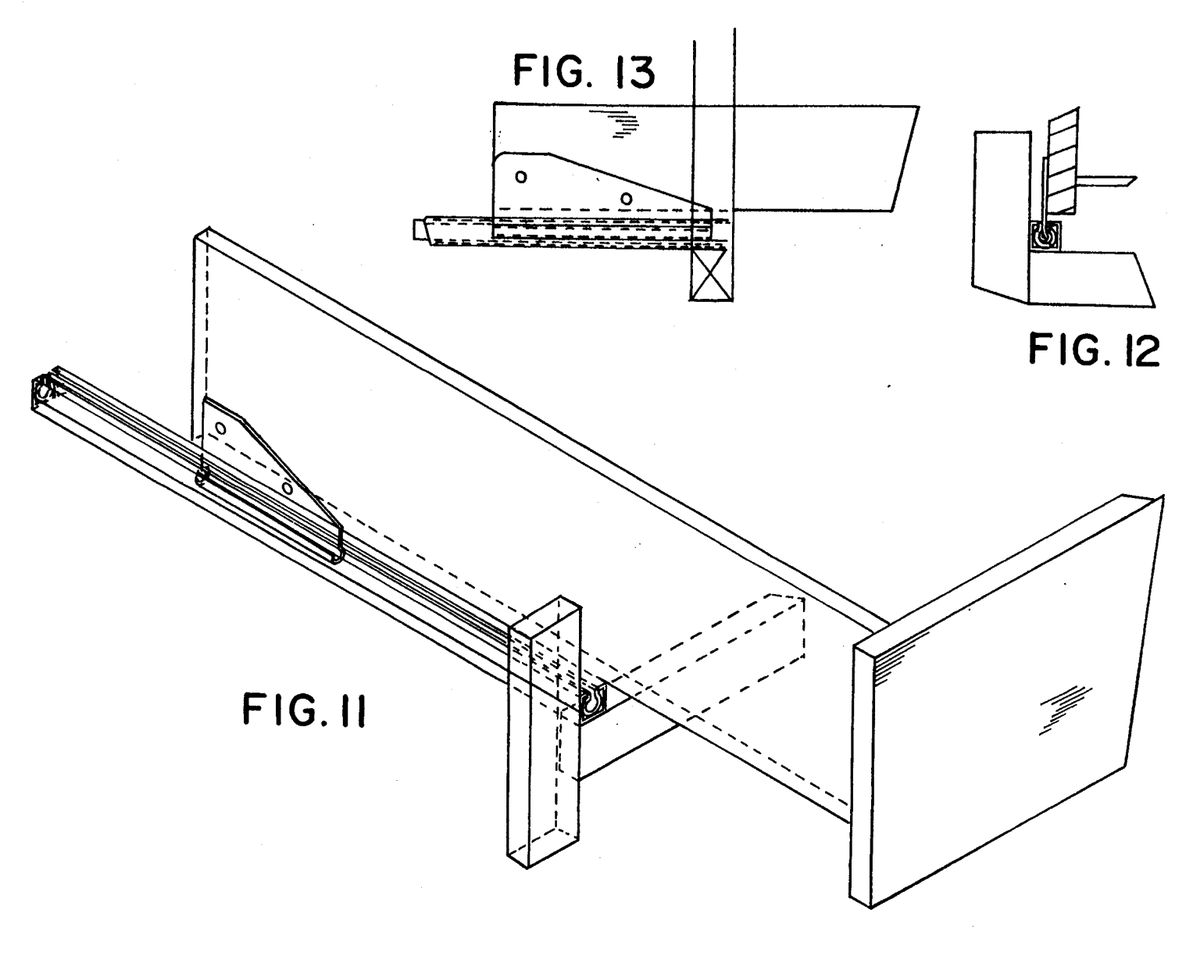
FIG. 11 is a perspective, fragmentary and sectional view of another arrangement of the slide system forming the present invention wherein the flange is reduced in length by comparison with the support channel.
FIG. 12 is an end elevational, sectional view of the arrangement shown in FIG. 11.
FIG. 13 is a side elevational, sectional and fragmentary view of the arrangement shown in FIGS. 11 and 12 focusing on the abbreviated flange.

There are many ways of affixing channel 46 to the frame or drawer. FIG. 6(a)–(j) discloses a number of such means which usually involve extending a brad or screw through a drilled hole so that it can fasten directly into the supporting frame and thereby securely hold channel 46 against displacement. While screws are generally appropriate for this purpose, obviously staples, glue, flanges or other device may be quite satisfactory depending upon the application required.

There are a great variety of ways of utilizing the slide system of the present invention to connect two movably joined surfaces. The design and operation of the present invention functions equally well moving in any direction with the forces applied directed up, down, sideways, or at any angle to the axis of the frame. The round shape of internal sleeve wall 52 and the flange-engaging edge 66 or cover makes skipping or out-of-track movement that occurs in many slide systems virtually impossible and provides for a consistent track throughout the motion of the slide.

FIGS. 7–17 show a variety of configurations of the slide system. It will be obvious that flange 64 and engaging end 66 can be configured to attach to almost any movable surface so as to engage support channel member 46 supported at a convenient location on an adjacent but connected surface. The uniquely circular design and smooth slide movement achieved by the present invention gives it universal application to an infinite number of technical areas without regard to load-bearing and directional properties.

Figures 14, 15, 16:
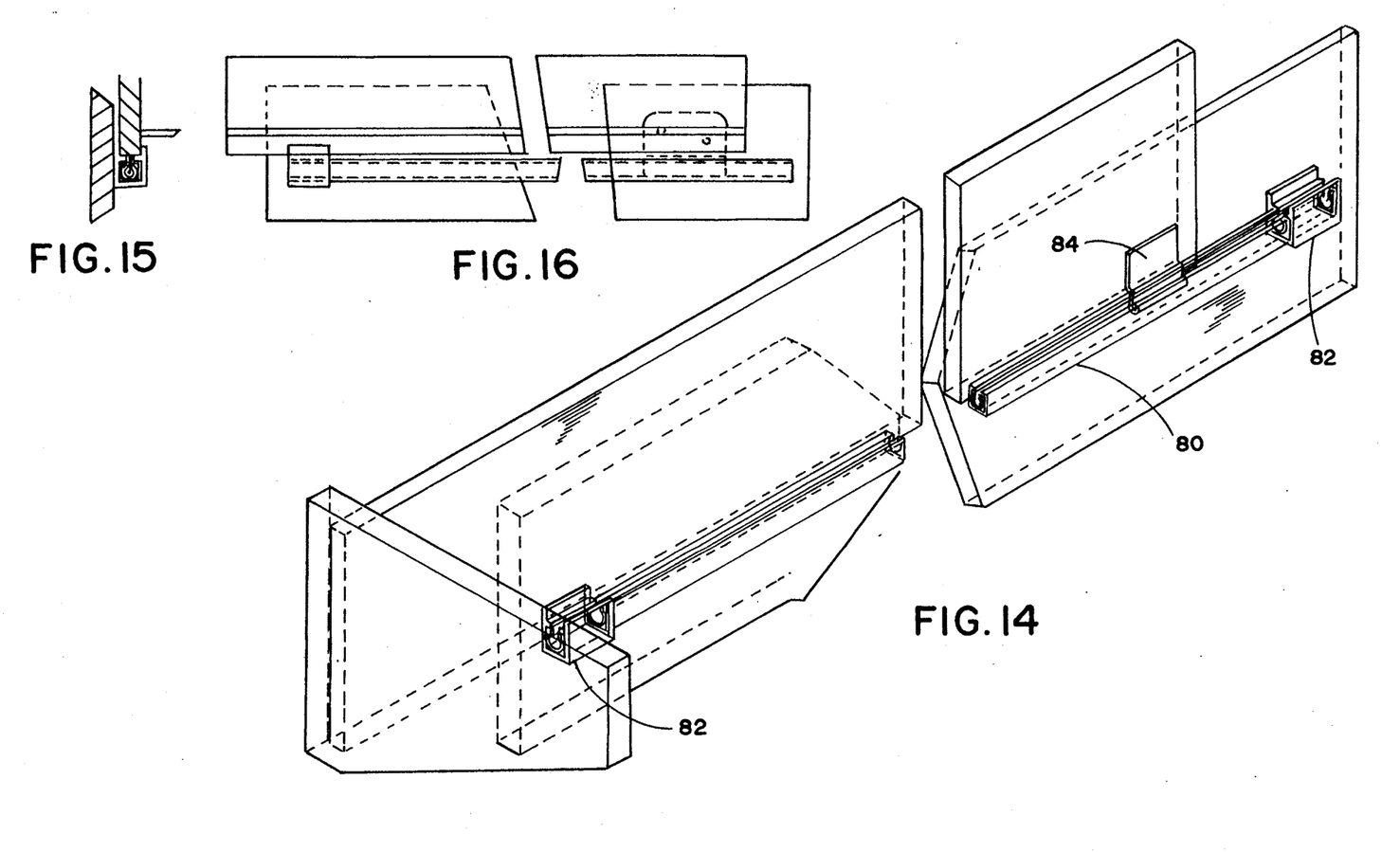
FIG. 14 is a perspective, sectional and fragmentary view of yet another arrangement of the slide system comprising the present invention showing another form of an abbreviated flange.
FIG. 15 is an end elevational, sectional view of the arrangement shown in FIG. 14.
FIG. 16 is a side elevational, sectional and fragmentary view of the embodiment shown in FIGS. 14 and 15.

Another very useful embodiment of the slide system comprising the present invention as shown in FIGS. 14–16 wherein support channel 80 is supported by two U-shaped clips 82 secured to the case side. These clips 82 function to guide and generally support the slide system. They may also operate as stops when the drawer is opened and/or closed because of the positioning of a shortened flange 84 secured to the drawer side as shown. This embodiment represents a material savings in that flange 44 is substantially shorter in this embodiment than in the others previously discussed but serves equally well to interconnect with the slide system in an efficient and substantial manner.

Figures 17, 18, 19, 20, 21:
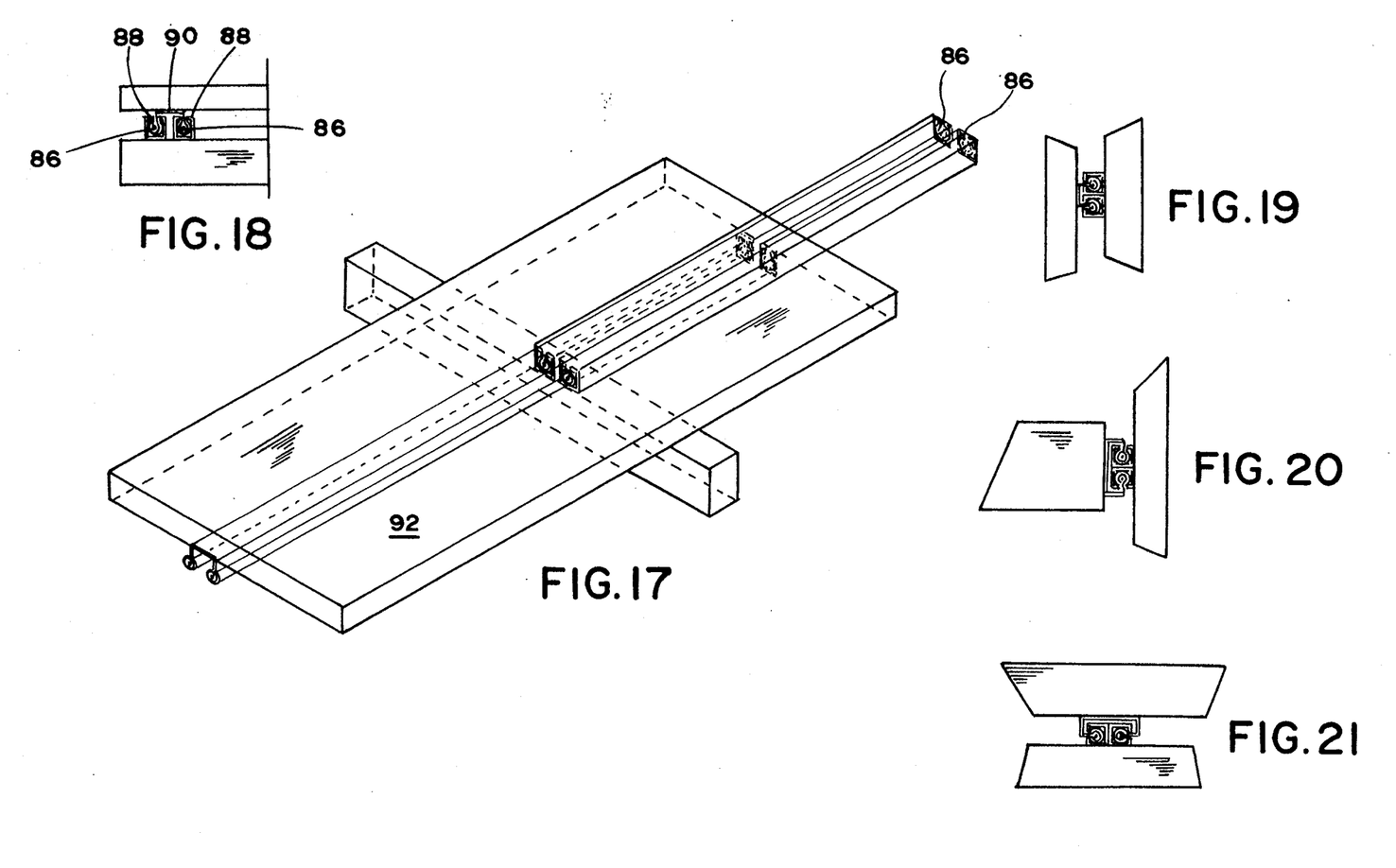
FIG. 17 is a perspective, sectional and fragmentary view of another embodiment of the slide system forming the present invention utilizing integrally connected flanges slidably cooperating with parallel support channels mounted on a pull-out shelf or unit.
FIG. 18 is an end elevational, sectional view of the embodiment shown in FIG. 17.
FIG. 19 is another variation of the embodiment shown in FIGS. 17 and 18.
FIG. 20 is another embodiment of the arrangement shown in FIGS. 17 and 18.
FIG. 21 is yet another embodiment of the arrangement shown in FIGS. 17 and 18.

Another embodiment of the slide system of the present invention as shown in FIGS. 17–21 and is designed to support a heavier than normal load by utilized two support channels 86 mounted in a side-by-side relationship and two flanges 88 that are integrally connected by a body portion 90. This embodiment can be mounted as shown in FIG. 17 to support a horizontal pull-out shelf 92 or as side members to support a drawer or pull-out unit as shown in FIGS. 19–21.

Figures 22, 23, 24:
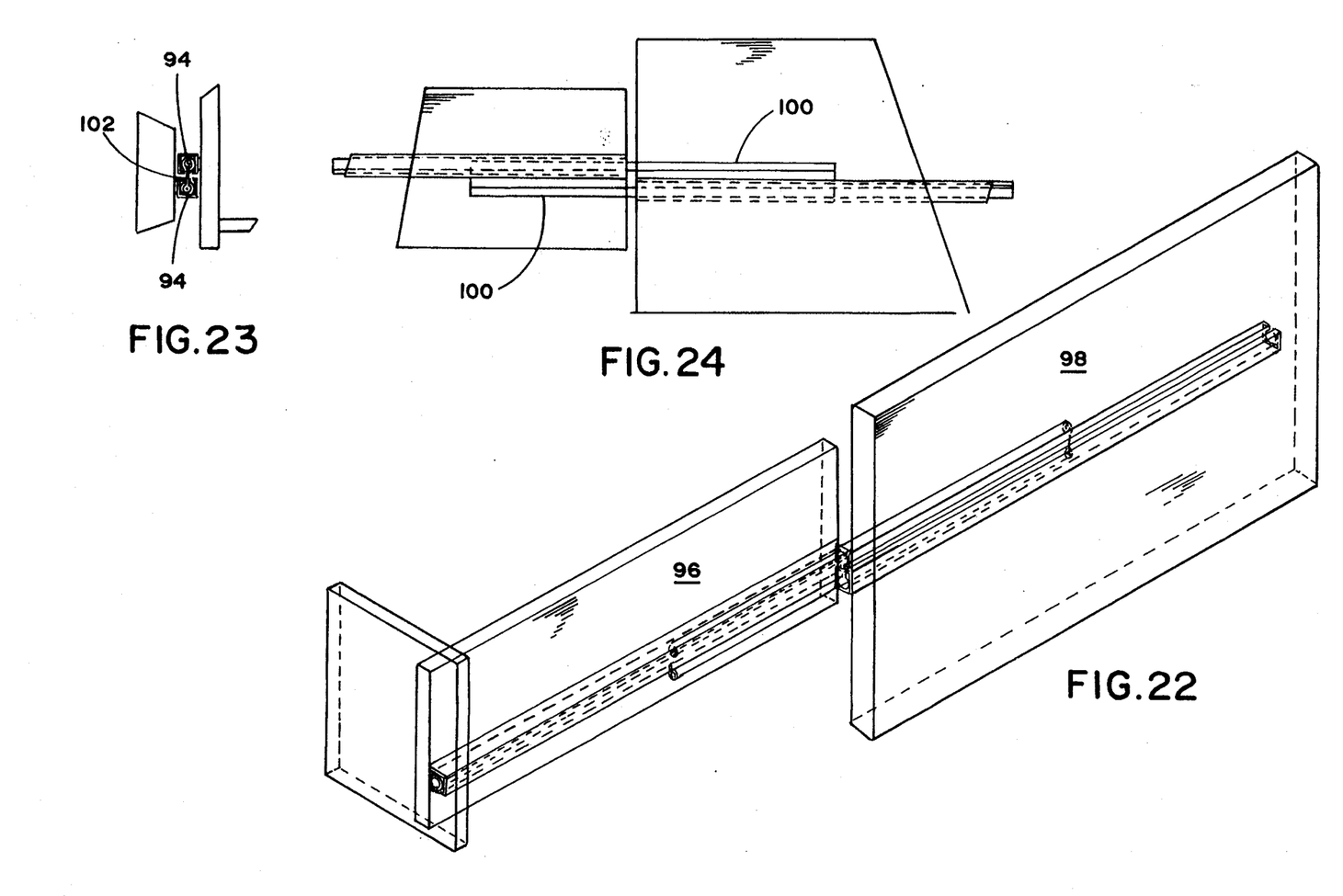
FIG. 22 is a perspective, sectional and fragmentary view of yet another embodiment of the slide system forming the present invention utilizing two support channels, one fastened to each article surface, and an integrally connected pair of flanges.
FIG. 23 is an end elevational, sectional view of the embodiment shown in FIG. 22.
FIG. 24 is a side elevational, sectional view of the embodiment shown in FIGS. 22 and 23.

A variation of the embodiment shown in FIGS. 17–21 is shown is FIGS. 22–23 wherein again two support channels 94 are affixed, one to a drawer side 96 and the other to a case side 98. Two flange members 100 are again integrally joined by a spanning section 102 in the manner best shown in FIG. 23.

Figures 25, 26:
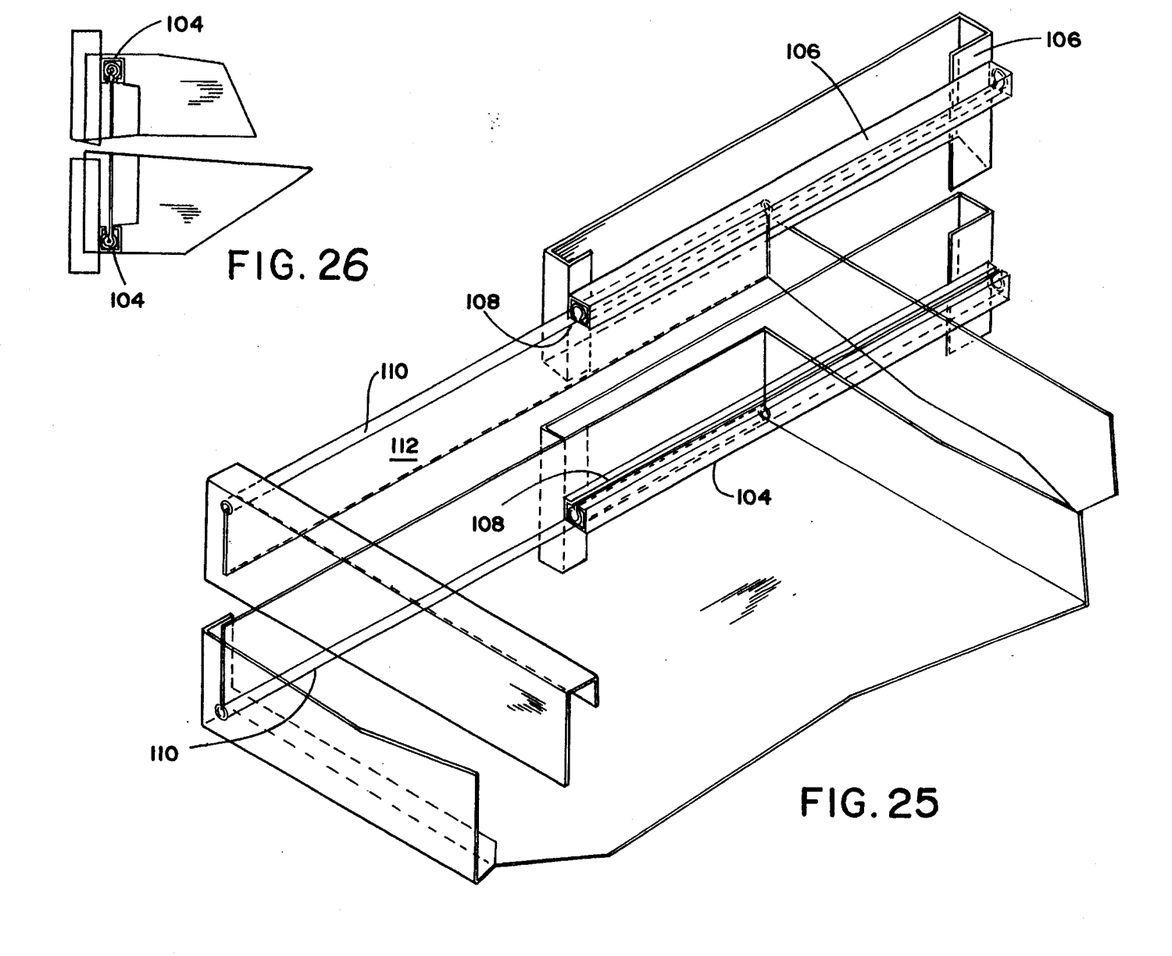
FIG. 25 is a perspective, sectional and fragmentary view of yet another embodiment of the slide system forming the present invention which is applicable to a metal drawer, drawer front and case wherein two support channels are affixed to the case and integrally connected flanges are connected to the drawer front and back.
FIG. 26 is an end elevational, sectional view of the embodiment shown in FIG. 25.

A variation of the embodiment shown in FIGS. 22–24 is shown is FIGS. 25 and 26 and is particularly applicable to metal drawers and frames. Here, two support channels 104 fasten to case side 106 with their openings 108 facing each other. Two flanges 110 are integrally joined by the drawer side 112 in the manner shown in FIG. 25. In this embodiment, it is perhaps desirable to weld support channels 104 to case side 106.

Figures 27, 28:
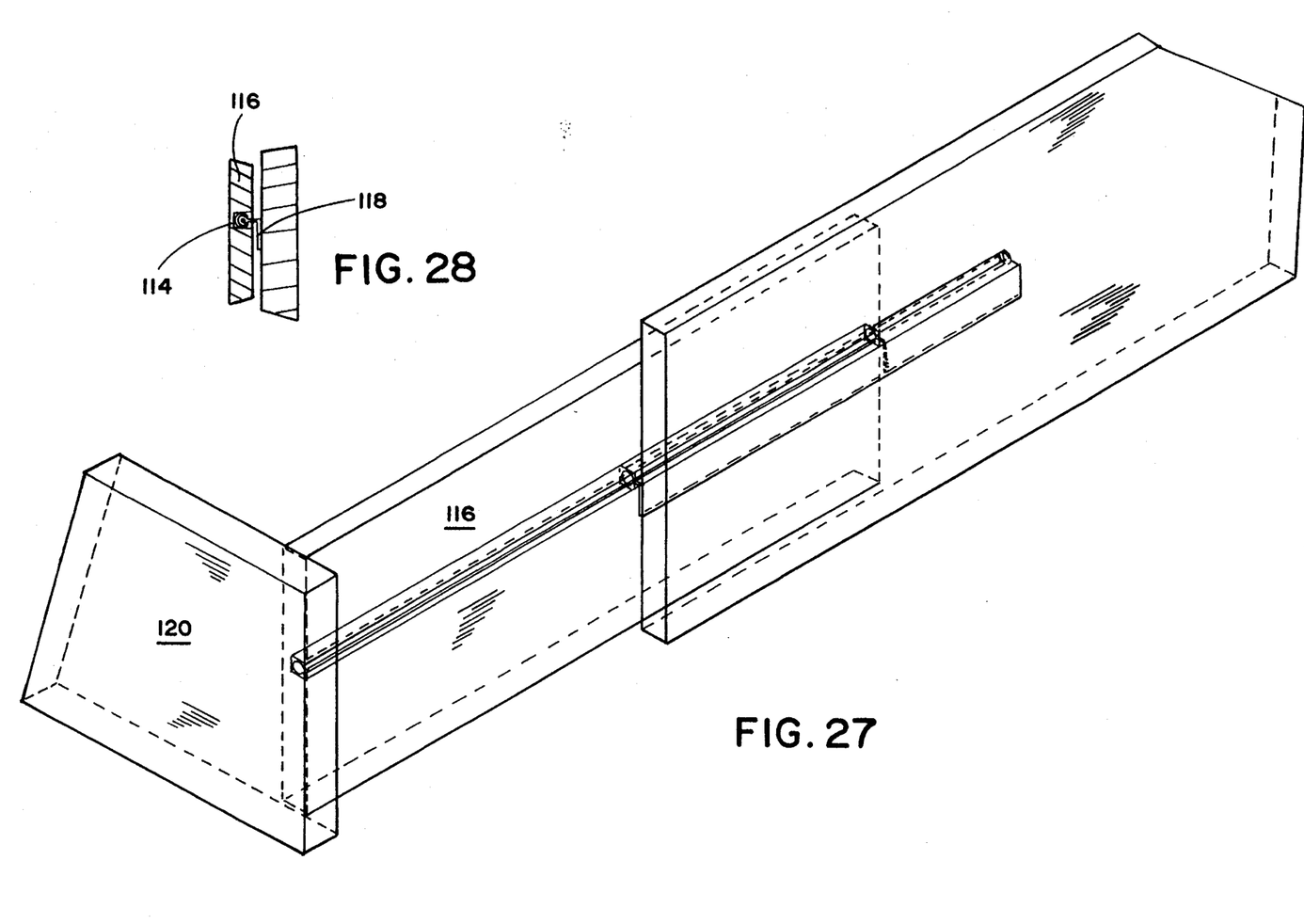
FIG. 27 is a perspective, sectional and fragmentary view of yet another embodiment of the slide system forming the present invention wherein the support channel is formed within the drawer side and the flange is carried by the end panel.
FIG. 28 is an end elevational, sectional view of the embodiment shown in FIG. 27.

Another embodiment of the slide system comprising the present invention as shown in FIGS. 27 and 28 and results upon installation in a virtually hidden system because of the interfitting nature of the installation. A support channel 114 is formed in the drawer side 116, and the flange 118 is affixed to the end panel and turned inwardly to fit within channel 114 in the manner shown in FIG. 28. In this embodiment, the drawer front 120 overlaps the front edge of drawer side 116 as shown in FIG. 27.

Figures 29, 30, 31, 32:
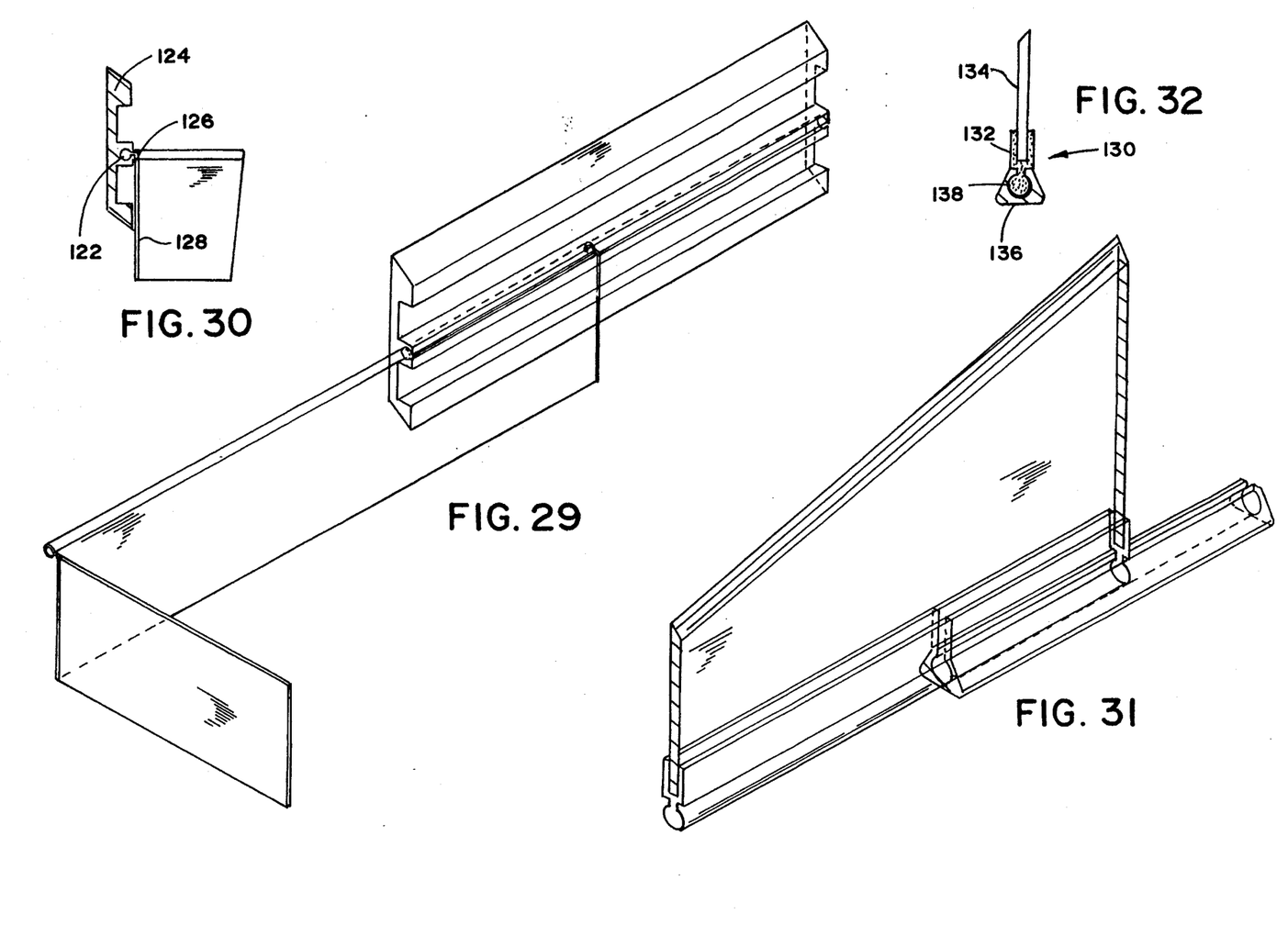
FIG. 29 is a perspective, sectional and fragmentary view of yet another embodiment of the slide system forming the present invention wherein the support channel is formed in the side of the end panel and the flange is an integral part of the drawer side wall.
FIG. 30 is an end elevational, sectional view of the embodiment shown in FIG. 29.
FIG. 31 is a perspective, sectional and fragmentary view of still another embodiment of the slide system forming the present invention wherein the support channel is formed in the supporting frame and the flange is removably secured to the drawer side wall.
FIG. 32 is an end elevational, sectional view of the embodiment shown in FIG. 31.

A variation of the embodiment shown in FIGS. 27 and 28 is shown in FIGS. 29 and 30 wherein a support channel 122 is formed in drawer side 124, preferably during the molding or extruding process. A flange 126 forms an integral part of drawer side 128.

Yet still another different embodiment of the slide system comprising the present invention as shown in FIGS. 31 and 32 wherein a flange shown generally as 130 has a U-shaped clamping portion 132 that frictionally captures the lower edge of, for example, a sliding glass or screen door 134. A support channel 136 having a trapezoidal external cross-sectional configuration includes an internal opening having a circular cross-section configuration adapted to receive the flange-extending member 138.

Thus, it can be seen that the deficiencies and disadvantages of prior art slide systems have been virtually eliminated in the present inventive concept. With respect to the description provided, it is to be realized that the optimum dimensional relationship for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed herein.

The foregoing is therefore considered as illustrative only of the principles of the invention. Further, since numerous modifications and changes will readily occur to those skilled in the art, it is not desired to limit the invention to the exact construction and operation shown and described. All suitable modifications and equivalents that fall within the scope of the appended claims are deemed within the present inventive concept.

What is claimed is:

1. A slide system for movably connecting adjacent articles comprising: a support channel carried by a first article, the support channel having four substantially straight sides forming a rectangular cross section, one of the sides having a slot therein; flange receiving means positioned within the support channel including a tubular member having a continuous slot therein forming two tubular member longitudinal edges, the edges extending through the side slot; a flange associated with a second article having means extending through the longitudinal edges, the side slot and into the flange receiving means whereby the flange and flange extending means slidably move within the flange receiving means to support and maintain the adjacent articles in substantially the same relationship with each other as they are moved in a substantially parallel relationship with respect to each other.

2. The system as claimed in claim 1 wherein the flange extending means includes a rolled edge of the flange shaped to fit within the flange receiving means and resist other than parallel movement therein.

3. The system as claimed in claim 1 wherein the flange extending means includes a substantially circular forward engaging portion cooperatively received within the internal sleeve.

4. The system as claimed in claim 1 wherein the flange extending means is a plastic bearing member formed to be cooperatively received within the flange receiving means.

5. The system as claimed in claim 1 wherein the support channel is hollow and internally substantially rectangular in cross section.

6. The system as claimed in claim 1 wherein the flange receiving means is an internal hollow sleeve.

7. The system as claimed in claim 5 wherein the internal sleeve is hollow and internally substantially circular in cross section.

8. The system as claimed in claim 7 wherein the support channel is hollow and internally substantially rectangular in cross section.

* * * * *